US008847568B2

(12) United States Patent
Barrenscheen et al.

(10) Patent No.: US 8,847,568 B2
(45) Date of Patent: Sep. 30, 2014

(54) SAMPLE-POINT ADJUSTMENT IN A SWITCHING CONVERTER

(75) Inventors: Jens Barrenscheen, Munich (DE); Giuseppe Bernacchia, Noventa Padovana (IT)

(73) Assignee: Infineon Technologies AG, Neubiberg (DE)

( * ) Notice: Subject to any disclaimer, the term of this patent is extended or adjusted under 35 U.S.C. 154(b) by 532 days.

(21) Appl. No.: 12/240,174

(22) Filed: Sep. 29, 2008

(65) Prior Publication Data

US 2010/0079181 A1 Apr. 1, 2010

(51) Int. Cl.
*G05F 1/00* (2006.01)
*H02M 3/156* (2006.01)

(52) U.S. Cl.
CPC ..................... *H02M 3/156* (2013.01)
USPC ........................................................ 323/284

(58) Field of Classification Search
USPC .................. 323/282–287; 363/21.17, 21.18
See application file for complete search history.

(56) References Cited

U.S. PATENT DOCUMENTS

| | | | | |
|---|---|---|---|---|
| 5,602,465 | A | * | 2/1997 | Clemente ..................... 323/300 |
| 6,020,729 | A | | 2/2000 | Stratakos et al. |
| RE37,609 | E | * | 3/2002 | Bittner ......................... 323/272 |
| 6,958,920 | B2 | * | 10/2005 | Mednik et al. ................. 363/19 |
| 6,969,976 | B1 | * | 11/2005 | Broach et al. ................. 323/222 |
| 7,098,640 | B2 | * | 8/2006 | Brown .......................... 323/283 |
| 7,498,784 | B2 | * | 3/2009 | Gokita et al. ................. 323/282 |
| 8,085,005 | B2 | * | 12/2011 | Dearn ........................... 323/222 |
| 2005/0275392 | A1 | * | 12/2005 | Wong et al. .................... 323/283 |
| 2007/0096706 | A1 | | 5/2007 | Terakado et al. |
| 2007/0112443 | A1 | * | 5/2007 | Latham et al. .................. 700/29 |
| 2007/0114985 | A1 | * | 5/2007 | Latham et al. ................ 323/283 |
| 2007/0152648 | A1 | * | 7/2007 | Gabello et al. ............... 323/288 |
| 2007/0210777 | A1 | * | 9/2007 | Cervera et al. ............... 323/284 |
| 2008/0183338 | A1 | | 7/2008 | Kimball et al. |

\* cited by examiner

*Primary Examiner* — Adolf Berhane
*Assistant Examiner* — Gary Nash
(74) *Attorney, Agent, or Firm* — Schiff Hardin LLP (57) ABSTRACT

An apparatus and method of generating a drive signal for a switch in a switching converter having input terminals for applying an input voltage, output terminals for providing an output signal, and at least one inductive storage element coupled to the switch. The method includes sampling the output signal to provide a sampled output signal, and generating a pulsewidth modulated drive signal having a duty cycle that is dependent on the sampled output signal, wherein the output voltage is sampled at sampling times that are dependent on the duty cycle.

32 Claims, 6 Drawing Sheets

SAMPLE-POINT ADJUSTMENT IN A SWITCHING CONVERTER

BACKGROUND

Switching converters include input terminals for supplying an input voltage and output terminals for providing an output voltage, at least one switch, at least on inductive storage element coupled to the switch, and at least one capacitive storage element. The at least one inductive storage element and the capacitive storage element form an LC-circuit, the switching element controlling energy transfer from the input terminals to the LC-circuit. The switching element is driven by a pulsewidth modulated drive signal that has a duty cycle that is set dependent on the output voltage in order to keep the output voltage constant.

Setting the duty cycle of the drive signal dependent on the output voltage requires sampling the output voltage. The output voltage may be sampled once during each switching cycle or once every several switching cycles. However, the output voltage may vary even during one switching cycle. This variation of the output voltage results from the LC-circuit receiving an oscillating input voltage, and from the LC-circuit being not capable of completely rectifying such oscillating input voltage. The variation of the output voltage during one switching cycle may be reduced by increasing a capacity of the capacitive storage element. However, this would increase the manufacturing costs.

BRIEF DESCRIPTION OF THE DRAWINGS

Examples will now be explained with reference to drawings. The drawings serve to illustrate the basic principle. Therefore, only those aspects required for illustrating the basic principle are depicted. Same reference signs denote same circuit blocks and same signals throughout the drawings.

DETAILED DESCRIPTION

Figure 1:
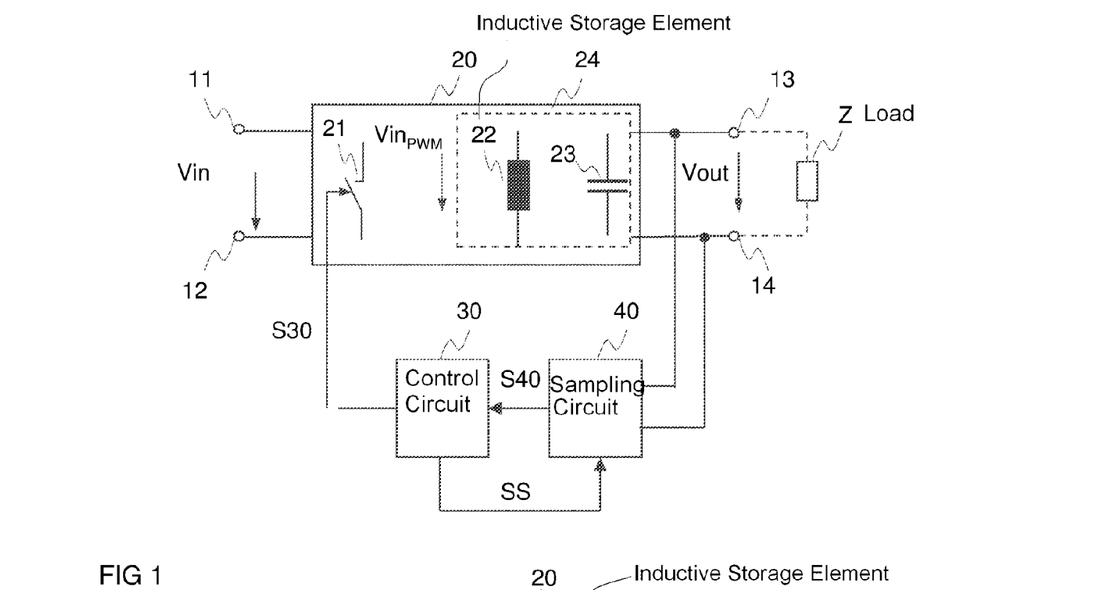
FIG. 1 illustrates an example of a switching converter by way of a block diagram.

FIG. 1 illustrates an example of a switching converter. The switching converter has input terminals 11, 12 for supplying an input voltage Vin, and output terminals 13, 14 for providing two output signals: an output current Iout; and an output voltage Vout. The input voltage Vin may be a DC voltage or may be an AC voltage. The input voltage may be generated by any voltage supply circuit (not shown). The output current Iout and output voltage Vout may be supplied to a load Z (shown in dashed lines). A general function of the switching converter is to keep one of its output signals, i.e. either the output current Iout or the output voltage Vout at least approximately constant, even in case of variations of the input voltage Vin and in case of variations of the power consumption of the load Z. The following explanation relates to a method for controlling the output voltage. However, this method may equivalently be applied to controlling the output current. Thus, "output voltage" in the following text may be replaced by "output current", without departing from the basic principle that is explained.

The switching converter includes a converter unit 20 that is connected between the input terminals 11, 12 and the output terminals 13, 14 and that includes at least one switching element 21, at least one inductive storage element 22, and at least one capacitive storage element 23. The at least one inductive storage element 22 and the at least one capacitive storage element 23 are part of a filter circuit or LC-circuit 24 that is connected to the output terminals 13, 14 and that is coupled to the input terminals 12, 13 via the at least one switching element 21.

The at least one switching element 21 serves to generate a pulsewidth modulated supply voltage $Vin_{PWM}$ from the input voltage Vin, the pulsewidth modulated supply voltage being supplied to the LC-circuit that rectifies the pulsewidth modulated supply voltage for providing the output voltage Vout. It should be noted that switching element 21 may be any switching element suitable for switching electric loads. Switching element 21 may, in particular, be a transistor, like a MOSFET or a bipolar transistor.

The switching converter further comprises a control circuit 30 for providing a pulsewidth modulated switching signal S30 to the at least one switching element 21. The pulsewidth modulated drive signal S30 has a duty cycle that controls a duty cycle of the pulsewidth modulated supply voltage $Vin_{PWM}$ being supplied to the LC-circuit and that, therefore, controls energy transfer from the input terminals 11, 12 to LC-circuit 24. In order to control the output voltage Vout, despite variations in the power consumption of the load Z, to a constant voltage value, the switching converter has a control loop or feedback loop that feeds back a sampled output signal S40 that is dependent on the output voltage Vout to control circuit 30. Control circuit 30 is adapted to modify the duty cycle of drive signal S30 in case the sampled output signal S40 indicates a changing, i.e. a decreasing or increasing, output voltage Vout. A decreasing output voltage Vout may result from an increased power consumption of the load Z or a decreasing input voltage Vin. In both cases the duty cycle of the pulsewidth modulated supply voltage needs to be increased. In the first case (increased power consumption of the load) increasing the duty cycle helps to increase the energy transfer from the input voltage to the LC-circuit and, therefore, helps to keep the output voltage constant; in the second case increasing the duty cycle helps to keep the energy transfer from the input voltage to the LC-circuit on a given value and, therefore, helps to keep the output voltage Vout constant. Control circuit 30 is further adapted to decrease the duty cycle of drive signal S30 in case the sampled output signal S40 indicates an increasing output voltage. An increasing output voltage Vout may result from a decreasing power consumption of load Z, or an increasing input voltage Vin. In the first case, decreasing the duty cycle results in a decreased energy transfer during one switching cycle; in the second case decreasing the duty cycle results in keeping the energy transfer on a given value. Increasing or decreasing the duty cycle serves to counterbalance an increase or a decrease in the output voltage Vout.

The basic principle as explained with reference to FIG. 1 applies to all different kinds of switching converters, including AC-DC-converters or DC-DC-converters. These different converters mainly differ from each other in their converter units 20. Just for illustration purposes examples of some converter unit 20 topologies will now be explained with reference to FIGS. 2 to 4. It should be noted that these topologies should be understood as examples only and that a general principle of obtaining the sampled output signal S40 which will be explained further below is not restricted to using one of these converter unit 20 topologies.

Figure 2:
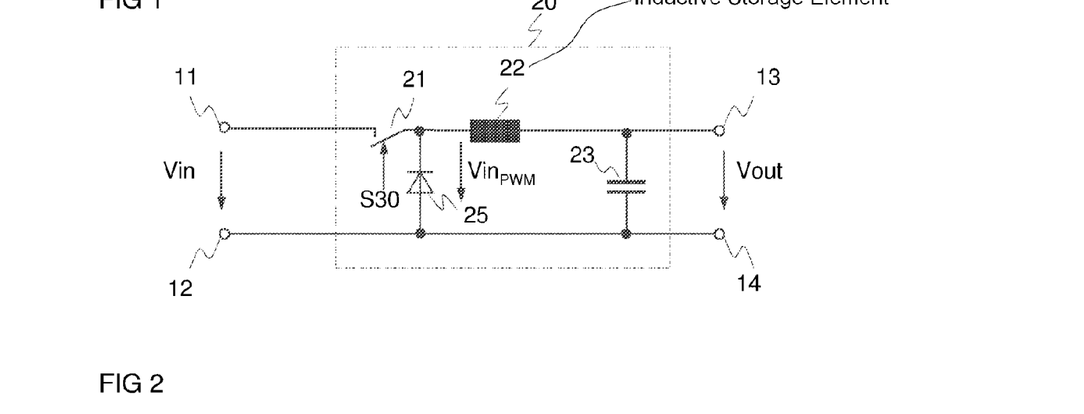
FIG. 2 illustrates an example of a buck converter.

FIG. 2 shows an example of a converter unit 20 having a buck converter topology. Such buck converter topology serves to provide an output voltage Vout that is lower than an input voltage Vin. Such buck converter topology is, in particular, used in DC-DC-converters. This converter unit 20 comprises one switching element 21, one inductive storage element 22 and one capacitive storage element 23. The switching element 21, the inductive storage element 22 and the capacitive storage element 23 form a series circuit that is connected between the input terminals 11, 12, the output voltage Vout being the voltage across the capacitive storage element 23 that, in this circuit, serves as an output capacitance. The inductive storage element 22 and the capacitive storage element 23 form an LC-circuit that is connected to the input terminals 11, 12 each time switching element 21 is closed. A rectifying element 25 is connected parallel to a series circuit with the inductive storage element 22 and the capacitive storage element 23. The rectifying element 25 takes over a current flowing through the inductive storage element 22 when switching element 21 is open. In this connection, it should be mentioned that rectifying element 25—in this example as well as in other examples that are explained further below—may be a diode (as shown in FIG. 2) or an active rectifying element that includes a switch.

Figure 3:
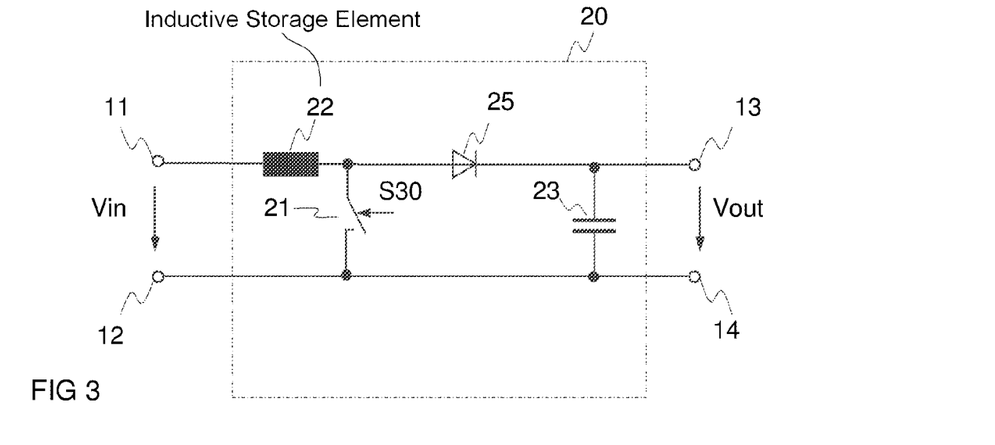
FIG. 3 illustrates an example of a boost converter.

FIG. 3 illustrates a converter unit 20 having a boost converter topology. Such converter unit serves to generate an output voltage Vout that is higher than an input voltage Vin. Such boost converter topologies are used in either AC-DC-converters or DC-DC-converters. This converter unit 20 comprises one switching element 21, one inductive storage element 22 and one capacitive storage element 23. In this converter unit 20 the inductive storage element 22 and the switching element 21 form a series circuit that is connected between the input terminals 11, 12. A further series circuit including a rectifying element 25 and the capacitive storage element 23 is connected parallel to the switching element 21, the output voltage Vout is the voltage across the capacitive storage element 23.

In the boost converter unit 20 of FIG. 3 the inductive storage element 22 stores energy each time switching element 21 is closed and transfers the stored energy—via rectifying element 25—to capacitive storage element 23 each time switching element 21 is open. Rectifying element 25 in this circuit prevents the capacitive storage element to be discharged when switching element 21 is closed.

Figure 4:
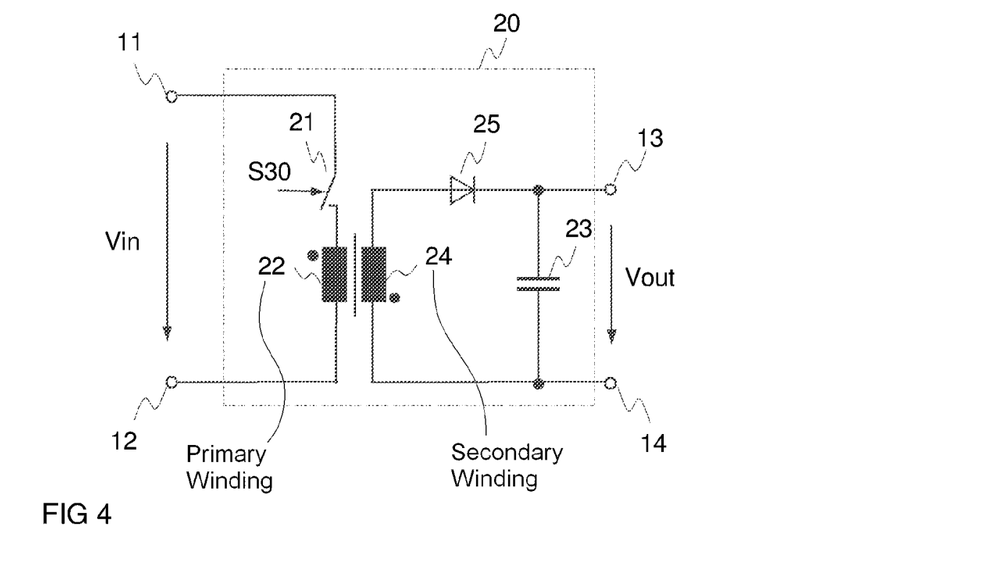
FIG. 4 illustrates an example of a fly-back converter.

FIG. 4 illustrates a converter unit 20 having a flyback converter topology. In this flyback converter topology inductive storage element 22 is a primary winding of a transformer that, besides primary winding 22, has a secondary winding 24 being inductively coupled to primary winding 22. The primary winding 22 and the switching element 21 form a series circuit that is connected between input terminals 11, 12. Secondary winding 24 and a rectifying element 25 form a second series circuit that is connected parallel to the capacitive storage element 23, the output voltage Vout being a voltage across capacitive storage element 23. In this flyback converter unit 20 the transformer stores energy each time switching element 21 is closed and transfers the stored energy via secondary winding 24 and rectifying element 25 to the capacitive storage element 23 each time the switching element 21 is opened.

Figure 5:
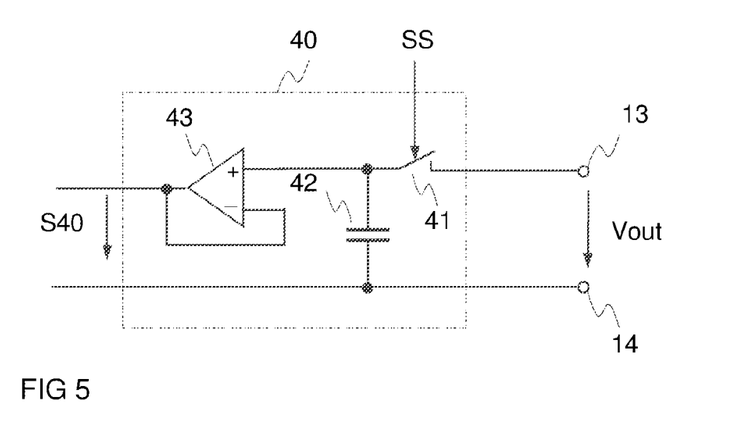
FIG. 5 illustrates an example of a sampling circuit of the switching converter.

Referring to FIG. 1, a sampling unit 40 provides the sampled output signal S40. Sampling unit 40 samples the output voltage Vout in accordance with a sampling signal SS that is provided by control circuit 30. Referring to FIG. 5 sampling circuit 40 may include a sample-and-hold-circuit that receives the output voltage Vout, samples the output voltage Vout in accordance with sampling signal SS, and provides the sampled output signal S40. Referring to the example shown in FIG. 5 the sample-and-hold-circuit may include a switching element 41 and a capacitor 42, the switching element 41 and the capacitor 42 forming a series circuit that receives output voltage Vout, i.e. that is connected to output terminals 13, 14. Switching element 41 is controlled by sampling signal SS. The sampled output signal S40 is a voltage across capacitor 42 or a voltage at an output of an optional buffer 43 that is connected to capacitor 42.

Figure 6:
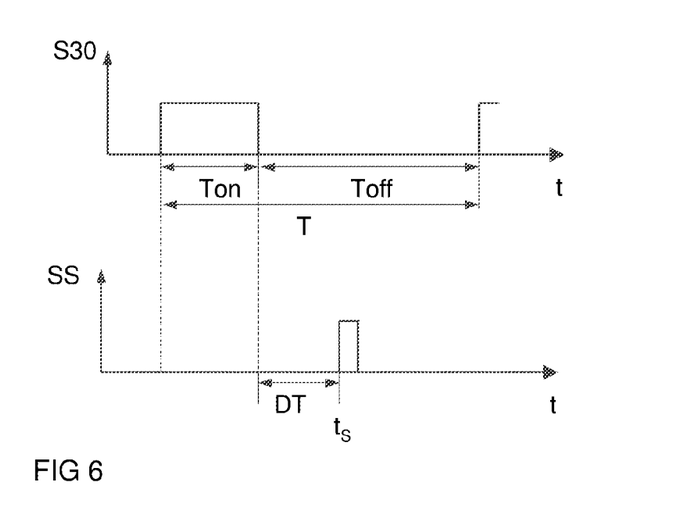
FIG. 6 illustrates timing diagrams of a pulsewidth modulated drive signal and a sampling signal.

FIG. 6 illustrates examples of timing diagrams of a pulse-width modulated drive signal S30 and a sampling signal SS. FIG. 6 illustrates one switching cycle of the drive signal S30. Such switching cycle includes an on-period Ton when switching element 21 is switched on, and an off-period Toff when switching element 21 is switched off. T denotes the cycle period with T=Ton+Toff. The duty cycle of drive signal S30 is given by:

$$D = \frac{Ton}{T}. \quad (1)$$

Sampling signal SS includes one sampling pulse during cycle period T. $t_S$ in FIG. 6 denotes a sampling time which is the time when a sampling pulse occurs. In the example of FIG. 6 sampling time $t_S$ lies within an off-period Toff. However, sampling time $t_S$ may alternatively lie within an on-period Ton. (A duration or activation time of the sampling pulse is short as compared to cycle period T. In one example a period of sampling pulse is less than five percent or even less than one percent of the cycle period T.

An instantaneous value of output voltage Vout that occurs at sampling time $t_S$ is stored in sampling unit 40, this instantaneous value at sampling time $t_S$ being provided as output signal S40 until output voltage Vout is again sampled at a next switching time $t_S$ in a next switching cycle. "Sampled switching cycle" in the following denotes a switching cycle in which the output voltage is sampled. In this connection it should be noted that the output voltage Vout, not necessarily, has to be sampled every switching cycle. Thus, the output voltage Vout may either be sampled in every switching cycle, or every several switching cycles. In the first case the output voltage may be sampled once or several times during each switching cycle. In the second case the number of switching cycles between two sampled switching cycles may vary.

Figure 7:
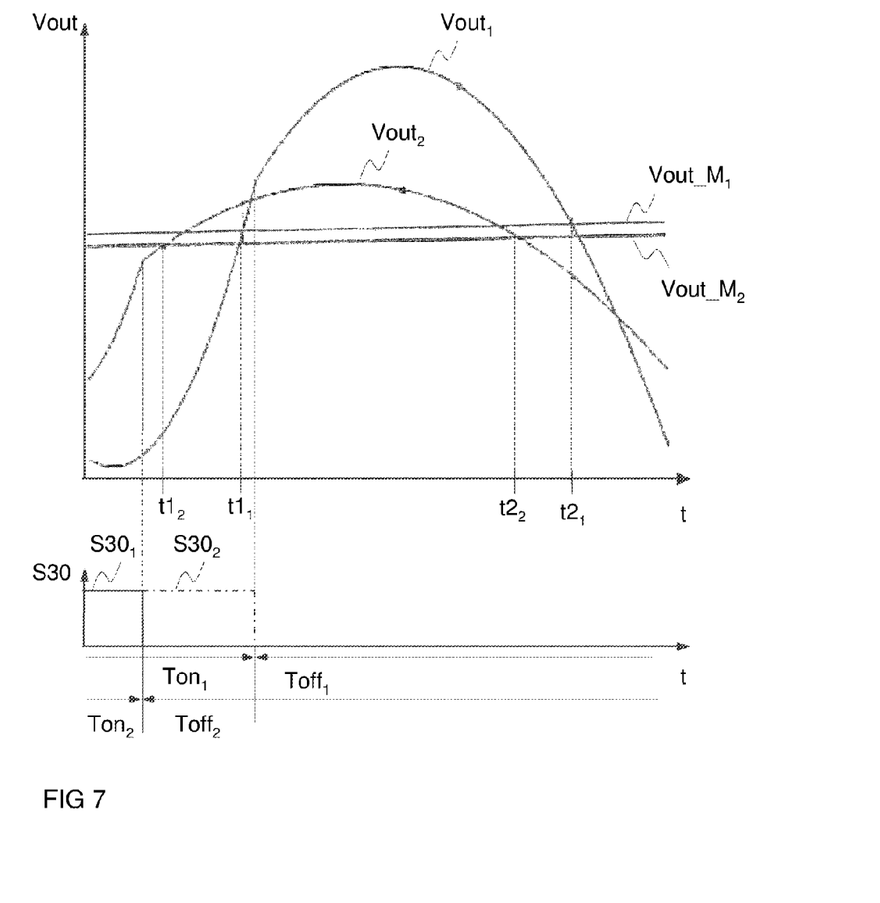
FIG. 7 illustrates timing diagrams of an output voltage of a switching converter for different duty cycles.

As already explained output voltage Vout may be subject to voltage variations within one switching cycle. These voltage variations are dependent on the duty cycle, which will be explained with reference to FIG. 7. FIG. 7 shows examples of timing diagrams of the output voltage Vout for two different scenarios: a first scenario in which duty cycle D has a first value; and a second scenario in which duty cycle D has a second value that is higher than the first value. The duty cycle $D_1$ for the first scenario is, for example, 0.1 (10%) and a second duty cycle $D_2$ for the second scenario is, for example, 0.3 (30%). In FIG. 7 subscript indices "1" denote signals or time periods for the first scenario, while subscript indices "2" denote signals or time periods for the second scenario. FIG. 7 further shows drive signals $S30_1$, $S30_2$ for these scenarios. Output voltage Vout has a mean value or a root mean square (rms) value. Vout_$M_1$, Vout_$M_2$ denote either of these two values for the two different scenarios depicted in FIG. 7.

As can be seen from FIG. 7 variations in the output voltage Vout during one switching cycle are dependent on the duty cycle, where in the example that is depicted in FIG. 7 the variations in the output voltage decrease with decreasing duty cycle The timing diagrams in FIG. 7 relate to a buck converter. However, the basic principle that is explained with reference to these timing diagrams also applies to any kind of converter. The voltage variations or the voltage ripple of the output voltage Vout do even occur for a constant input voltage Vin and a constant power consumption of the load. In order to prevent these voltage variations from negatively influencing control of the output voltage Vout, output voltage Vout should be sampled at those times, when the output voltage Vout equals its mean value or its rms-value or is at least close to this mean value or rms-value. $t1_1$, $t2_1$ in FIG. 7 denote those times when the output voltage $Vout_1$ in the first scenario has its mean value or rms-value, and $t1_2$, $t2_2$ denote those time at which output voltage $Vout_2$ in the second scenario has its mean value or rms-value. In the first scenario one of these times ($t1_1$) lies within an on-period $Ton_1$, and one of these times ($t2_1$) lies within an off-period $Toff_1$. In the second scenario both times lie within an off-period $Toff_2$. For large duty cycles both times may even lie within the on-period (not shown).

Figure 8:
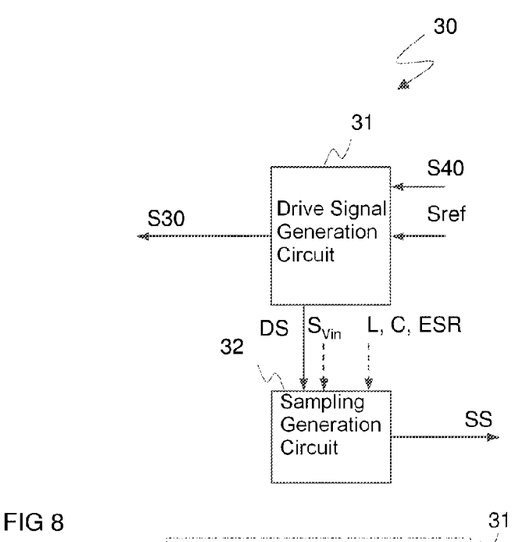
FIG. 8 illustrates an example of a control circuit generating a pulsewidth modulated drive signal, the control circuit comprising a drive signal generation circuit and a sampling signal generation circuit.

In order to ensure proper sampling of the output voltage the sampling signal SS that defines the sampling times is generated dependent on the duty cycle DC of drive signal S30. FIG. 8 shows a block diagram of an example of a control circuit 30 that generates switching signal SS dependent on the duty cycle DC. This control circuit 30 includes a drive signal generation circuit 31 that receives voltage signal S40 and a reference signal Sref, the reference signal Sref defining a setpoint or desired value for output voltage Vout. Drive signal generation circuit 31 generates pulsewidth modulated drive signal S30 dependent on the sampled output signal S40 and reference signal Sref and, more particularly, dependent on a difference between sampled output signal S40 and reference signal Sref. Drive signal generation circuit 31 is, in particular, adapted to increase the duty cycle of drive signal S30 in case sampled output signal S40 indicates that output voltage Vout has fallen below the desired value set by reference signal Sref, and is adapted to decrease the duty cycle of drive signal S30 in case the sampled output signal S40 indicates that the output voltage Vout has exceeded the desired value defined by reference signal Sref. Drive signal generation circuit 31 provides a duty cycle signal DS that includes an information on the duty cycle to sampling signal generation circuit 32.

The duty cycle signal DS may be the drive signal S30 itself, in this case sampling generation circuit 32 is adapted to retrieve information on the duty cycle from the drive signal S30 by evaluating the drive signal S30 for one cycle period. Duty cycle information signal DS may either be a separate signal that contains an information on the duty cycle D.

Sampling signal generation circuit 32 may include a lookup-table in which the duty cycles and corresponding switching times are stored. Sampling signal generation circuit is adapted to retrieve a stored switching time that corresponds to the duty cycle represented by the duty cycle signal DS and to generate switching signal SS dependent on this switching time information. The information on the switching time may be stored in the lookup-table as a time relative to a reference time of the switching cycle. Referring to FIG. 6 such reference time of the switching cycle may be a time when on-period Ton ends and off-period Toff starts. However, any other reference time may be used, like, for example, the beginning of a switching cycle or a time that lies a fixed time period after the beginning of the switching cycle. In the example of FIG. 6 a switching cycle starts when on-period Ton starts. Switching time $t_S$ is in this case represented by a delay time or time difference DT between such reference time and the sampling time $t_S$.

Duty cycle values and corresponding switching times or delay times that are stored in the lookup-table may be obtained by simulating a switching converter that has a given topology using conventional simulation tools. The values obtained by this simulation are then stored in the sampling signal generation circuit 32 of a switching converter that has a topology that corresponds to the topology of the simulated switching converter.

Alternatively to including a lookup-table that stores duty cycle values and corresponding switching time information sampling signal generation circuit 32 may include a computation unit that calculates the sampling time information for each duty cycle information it receives from drive signal generation circuit 31. A function that assigns duty cycle values to sampling time information and that is implemented in such computation unit is different for different switching converter topologies. However, for each switching converter topology such function may be obtained by simulations and may then be implemented in the sampling signal generation circuit. The switching time information that is stored to a given duty cycle value or that is calculated to a given duty cycle value is selected such that the output voltage corresponds to its mean value or to its rms-value at the time given by the sampling time information.

Besides the duty cycle, the inductivity of inductive storage element 22, the capacity of capacitive storage element 23 and the equivalent series resistance (ESR) of inductive storage element 23 may either influence the time behaviour of output voltage Vout during one switching cycle. Assuming that these parameters are constant, then these parameters can already be considered in the simulation that serves to generate the lookup-table or that serves to evaluate the function that assigns duty cycle values to switching time information.

Besides the duty cycle the instantaneous value of the input voltage Vin may influence the time behaviour of the output voltage Vout within one switching cycle. In switching converters in which the input voltage Vin may vary sampling signal generation circuit 32 receives information $S_{Vin}$ on the input voltage Vin and considers this information in generating the sampling signal SS. The dependency of the output voltage Vout on the input voltage Vin may be taken into account by providing different lookup-tables in switching signal generation circuit 32, each of these lookup-tables including a number of pairs with duty cycle values and corresponding sampling time information, and each of these lookup-table holding value pairs for different input voltages. In this case, sampling time information for a duty cycle represented by duty cycle signal DS and for an input voltage represented by input voltage signal $S_{Vin}$ is read from the lookup-table that is assigned to the input voltage represented by input voltage signal $S_{Vin}$.

Instead of including different lookup-tables for different input voltages sampling signal generation circuit 32 may either include a computation unit that calculates the sampling time information dependent on the duty cycle information represented by input voltage signal $S_{Vin}$. A function that is used by such computation unit for calculating the sampling time information may be obtained by simulating the switching converter for different input voltages and different duty cycle values using conventional simulation tools for electronic circuits.

According to one example it is intended to use a given control circuit 30 for switching converters having different inductivities of their inductive storage element, capacities of their capacitive storage element or equivalent series resistances of their capacitive storage element. In this case sampling signal generation circuit 32 receives information about inductivities, capacities and equivalent series resistances and considers this information in calculating or looking up the switching time for different duty cycle values and/or input voltage values represented by the duty cycle signal DS and/or input voltage signal $S_{Vin}$.

Further, for a given inductive storage element and a given capacitive storage element, the inductivity, capacity and ESR may vary dependent on the temperature. According to one example sampling time generation circuit receives a temperature signal T and is adapted to take into account this information in looking-up or calculating the switching sampling time. In one example sampling time generation circuit 32 includes a number of lookup-tables, where one of these lookup-tables is assigned to one given temperature. In another example sampling time generation circuit 32 includes a computation unit that considers temperature information when calculating the sampling time information dependent on the duty cycle.

Figure 9:
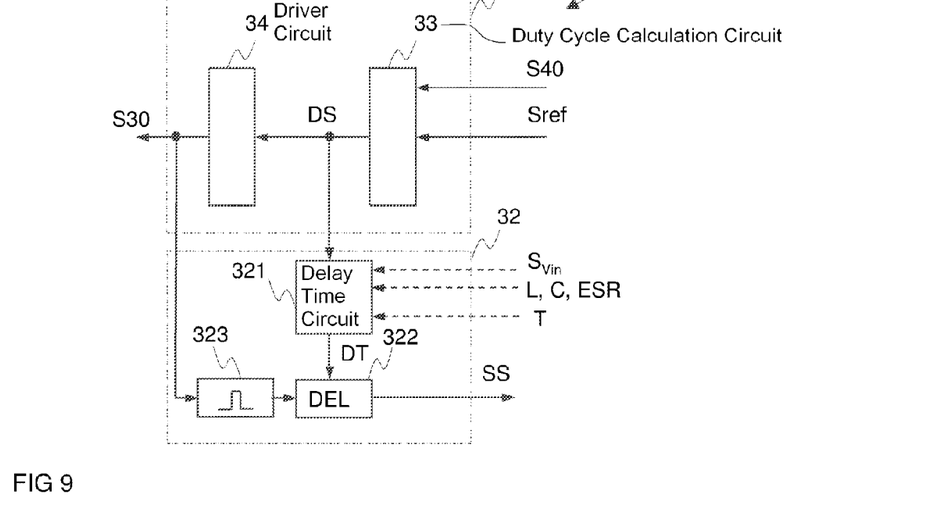
FIG. 9 illustrates first examples of the drive signal generation circuit and the sampling signal generation circuit.

FIG. 9 illustrates an example of a control circuit 30 that may be realized as a digital circuit. In this control circuit drive signal generation circuit 31 includes a duty cycle calculation circuit 33 that receives sampled output signal S40 and reference signal Sref and that calculates duty cycle signal DS that represents the duty cycle dependent on these two signals. A driver circuit 34 receives the duty cycle signal DS and generates the pulsewidth modulated drive signal S30 having a duty cycle that is represented by duty cycle signal DS.

The sampling signal generation circuit 32 of this control circuit comprises a pulse generation circuit 323 that receives drive signal S30. Pulse generation circuit 323 is adapted to generate a signal pulse with each reference time in drive signal S30. As explained above, reference time of drive signal S30—referring to FIG. 6—may be the time, when drive signal S30 changes its signal level from an on-level to an off-level, i.e. a time when on-period ends and off-period starts. However, reference time may be any other reference time in a switching cycle. For example, reference time may either be the time when a switching cycle starts, i.e. when drive signal S30 changes its signal level from an off-level to an on-level, i.e. when on-period Ton starts. Delay time or time difference DT that represents the time difference between reference time and sampling time is, of course, adapted to the selection of the reference time.

The control circuit 31 of FIG. 9 further comprises a delay element 322 that receives an output signal of pulse generation circuit 323. Delay element 322 delays the signal pulse that is generated with each reference time by pulse generation circuit 323 for delay time DT and provides sampling signal SS at an output terminal. Sampling signal generation circuit 32 further comprises a delay time circuit 321 that provides delay time DT—or more precisely: an information on delay time DT—to delay circuit 322. Delay time circuit 321 provides delay time DT dependent on the duty cycle represented by duty cycle signal DS. Delay time circuit 321 in this connection may comprise a lookup-table in which duty cycle values and corresponding delay times are stored, the delay times DT representing sampling time information in this case. Delay time circuit 321 may either comprise a computation circuit that calculates the delay time DT dependent on the duty cycle represented by duty cycle signal DS. With regard to obtaining delay time values DT for different duty cycles or with regard to a function that calculates the delay time for different duty cycle values, reference is made to the description of FIG. 8, in particular, to the general description of sampling signal generation circuit 32.

Figure 10:
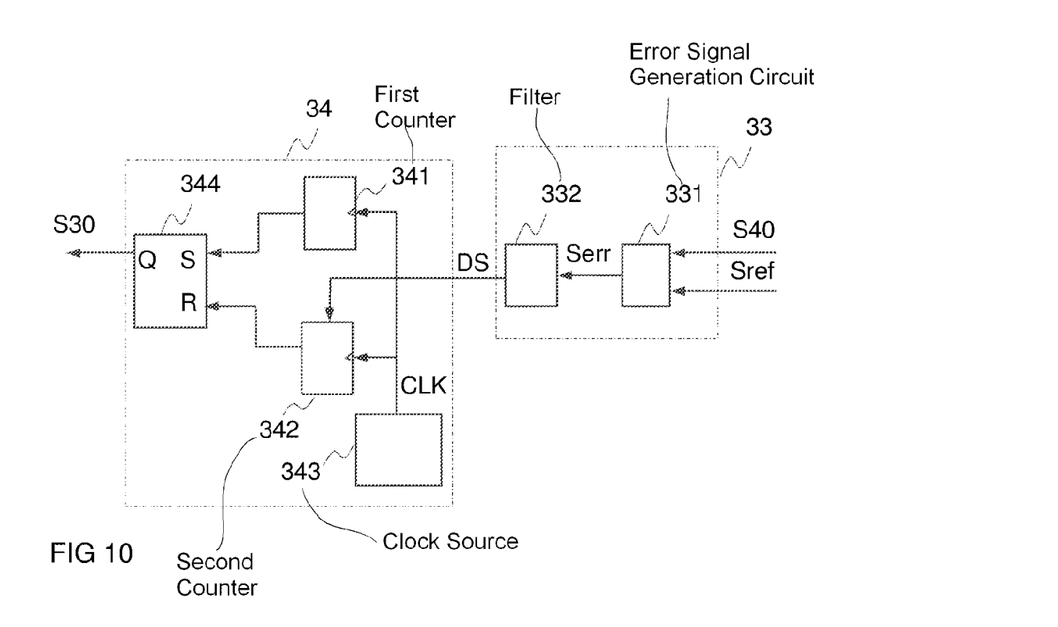
FIG. 10 illustrates a detailed example of a drive signal generation circuit.

An example of duty cycle calculation circuit 33 and drive circuit 34 is illustrated in FIG. 10. The duty cycle calculation circuit 33 includes an error signal generation circuit 331, that receives sampled output signal S40 and reference signal SREF. Error signal generation circuit 331 in one example is adapted to generate an error signal Serr that is proportional to a difference between reference signal Sref and sampled output signal S40. Error signal Serr is provided to a filter 332, that may be a digital filter having a proportional filter characteristic (P-filter), an integrating filter characteristic (I-filter) or a proportional-integrating filer characteristic (PI-filter). Filter 332 provides the duty cycle signal DS, i.e. the signal that represents the duty cycle D. Filter 332 and error signal generation circuit 331 are adapted to each other in such a way that a duty cycle that is represented by duty cycle signal DS is increased if sampled output signal S40 indicates that output voltage Vout has fallen below a reference value given by reference signal, and such that the duty cycle represented by duty cycle signal DS is decreased in case sampled output signal S40 indicates that the output voltage Vout has exceeded a desired value represented by reference signal Sref.

Drive circuit 34 referring to FIG. 3 includes a clock source 343 providing a clock signal, first and second counters 341, 342 and a flip-flop 344. Both counters, 341, 342 have a clock input for receiving a clock signal CLK. Flip-flop 344 provides drive signal S30. In this connection, it should be mentioned that control circuit 34 may, additionally, include an amplifier circuit that amplifies the output signal of flip-flop 344 for providing a drive signal suitable for driving switching element (21 in FIG. 1). Flip-flop 344 comprises two states: a set-state and a reset-state, one of these states representing an on-level of drive signal S30, and the other of these states representing an off-level of drive signal S30. For explanation purposes it may be assumed that drive signal S30 has an on-level if flip-flop 344 is in its set state, and that drive signal S30 has an off-level if flip-flop 344 is in its reset state. First counter 341 is adapted to set flip-flop 344 each time its counter value reaches a given value and to restart counting beginning with a start value after the given counter value has been reached. First counter 341 determines the overall switching cycle period. Second counter 342 is adapted to reset flip-flop 344 each time it reaches a counter value that is determined by duty cycle signal DS and is adapted to restart counting starting with a start value after it has reached this counter value dependent on the duty cycle signal DS. Second counter 342, therefore, determines the on-period Ton of the drive signal S30.

First and second counter 341, 342 may be replaced by one counter (not shown) that counts in accordance with clock signal CLK and that provides a counter signal that is compared with two reference values: a first reference value that determines the end of an on-period; and a second reference value that determines the end of a switching cycle. Flip-flop 344 is set—and switching cycle and on-period starts—each time a counter value reaches the first reference, with counter after having reached this first reference value starts counting with a start value. Flip-flop 344 is reset—an on-period ends—each time the counter value reaches the second reference value that may be smaller than the first reference value. The relationship between the first reference value, that is a fixed value, and variable second reference value determines the duty cycle.

Finally it should be mentioned, that features that have been explained with reference to one figure may also be combined with features explained with reference to other figures even in those cases in which this is not explicitly been mentioned. In particular, features mentioned in one of the following claims may be combined with features of any of the other claims.

The invention claimed is:

1. A method of generating a drive signal for a switch in a switching converter having input terminals for applying an input voltage, output terminals for providing an output signal, and at least one inductive storage element coupled to the switch, the method comprising:
sampling instantaneous values of the output signal to provide a sampled output signal;
generating a pulsewidth modulated drive signal having a duty cycle that is dependent on the sampled output signal;
determining the duty cycle of the pulsewidth modulated drive signal; and
determining when to sample the instantaneous values of the output signal based on the determined duty cycle.

2. The method of claim 1, wherein the inductive storage element has an inductance value, and the sampling time is dependent on the inductance value.

3. The method of claim 1, wherein the switching converter comprises an output capacitance having a capacitance value, and the sampling time is dependent on the capacitance value.

4. The method of claim 1, wherein the sampling time is selected such that a value of the sampled output signal at the sampling time equal to or approximately corresponds to a mean value or a root mean square value of the output signal.

5. The method of claim 1, further comprising setting the sampling time, wherein the setting comprises:
detecting a reference time in the drive signal; and
calculating a delay time that is dependent on the duty cycle, wherein the sampling time is a time that is delayed for the delay time as compared to the reference time.

6. The method of claim 1, wherein the switching converter is an element selected from a group of elements consisting of: a buck converter, a boost converter, and a flyback converter.

7. The method of claim 1, wherein the sampling comprises sampling the output signal at least once during each switching cycle.

8. The method of claim 1, wherein the sampling comprises sampling the output signal once per several switching cycles.

9. The method of claim 1, wherein the output signal is an output voltage.

10. The method of claim 1, wherein the output signal is an output current.

11. The method of claim 1, wherein the instantaneous values of the output signal are sampled by a sampling signal generation means coupled directly to the output terminals.

12. The method of claim 1, wherein the instantaneous values of the output signal are instantaneous voltage values.

13. The method of claim 1, further comprising:
sampling the instantaneous values of the output signal by a sampling unit.

14. The method of claim 1, wherein determining the duty cycle of the pulsewidth modulated drive signal comprises:
receiving, by a sampling signal generation circuit, the pulsewidth modulated drive signal; and
determining, by the sampling signal generation circuit and based on the received pulsewidth modulated drive signal, the duty cycle of the pulsewidth modulated drive signal.

15. The method of claim 1, wherein determining when to sample the instantaneous values of the output signal comprises:
providing a duty cycle signal that includes an information on the duty cycle;
obtaining a sampling time information by either looking up the sampling time information in a lookup table, or by calculating the sampling time information based on the duty cycle signal; and
obtaining the sampling times based on the sampling time information and sampling the instantaneous values of the output signal at the sampling times.

16. A switching converter, comprising:
input terminals for applying an input voltage;
output terminals for providing an output signal;
at least one switch that receives a pulsewidth modulated drive signal;
at least one inductive storage element coupled to the switch;
a sampling signal generation circuit adapted to determine a duty cycle of the pulsewidth modulated drive signal, to determine when to sample instantaneous values of the output signal based on the determined duty cycle, and to generate the sampling signal dependent on the duty cycle; and
a control circuit adapted to receive the sampled output signal, and to set the duty cycle of the pulsewidth modulated drive signal dependent on the sampled output signal.

17. The switching converter of claim 16, wherein the sampling signal generation circuit is further adapted to generate a sampling pulse, that affects sampling of the output signal.

18. The switching converter of claim 17, wherein the sampling signal generation circuit is further adapted to generate a sampling pulse during each switching cycle of the pulsewidth modulated drive signal.

19. The switching converter of claim 17, wherein the sampling signal generation circuit comprises a lookup-table in which duty cycle values and corresponding sampling time values are stored, wherein the stored sampling time values are relative sampling time values that are related to a reference time in a switching cycle.

20. The switching converter of claim 17, wherein the sampling signal generation circuit comprises a sampling time calculation unit.

21. The switching converter of claim 16, wherein the output signal is an output voltage.

22. The switching converter of claim 16, wherein the output signal is an output current.

23. The switching converter of claim 16, wherein the switching converter is an element selected from a group of elements consisting of: a buck converter, a boost converter, and a flyback converter.

24. The switching converter of claim 16, wherein the control circuit further comprises a drive signal generation circuit adapted to generate the pulsewidth modulated drive signal dependent on a difference between the sampled output signal and a reference signal.

25. The switching converter of claim 16, wherein the sampling circuit is coupled directly to the output terminals.

26. The switching converter of claim 16, wherein the instantaneous values of the output signal are instantaneous voltage values.

27. The switching converter of claim 16, further comprising:
   a sampling unit adapted to sample instantaneous values of the output signal.

28. The switching converter of claim 16, wherein the sampling signal generation circuit is configured:
   to receive the pulsewidth modulated drive signal, and
   to determine based on the received pulsewidth modulated drive signal the duty cycle of the pulsewidth modulated drive signal.

29. The switching converter of claim 16, wherein the sampling signal generation circuit is configured:
   to receive a duty cycle signal that includes an information on the duty cycle,
   to obtain a sampling time information by either looking up the sampling time information in a lookup table, or by calculating the sampling time information based on the duty cycle signal, and
   to generate the sampling signal based on the sampling time information.

30. A switching converter, comprising:
   input terminals for applying an input voltage;
   output terminals for providing an output signal;
   at least one switch that receives a pulsewidth modulated drive signal;
   at least one inductive storage element coupled to the switch;
   a sampling signal generation means for determining the duty cycle of the pulsewidth modulated drive signal, and determining when to sample instantaneous values of the output signal based on the determined duty cycle, and to provide the sampling signal based on the duty cycle of the pulsewidth modulated drive signal; and
   a control means for receiving the sampled output signal, and for setting a duty cycle of the pulsewidth modulated drive signal dependent on the sampled output signal.

31. The switching converter of claim 30, wherein the sampling signal generation means is coupled directly to the output terminals.

32. The switching converter of claim 30, wherein the instantaneous values of the output signal are instantaneous voltage values.

* * * * *

UNITED STATES PATENT AND TRADEMARK OFFICE
CERTIFICATE OF CORRECTION

| | |
|---|---|
| PATENT NO. | : 8,847,568 B2 |
| APPLICATION NO. | : 12/240174 |
| DATED | : September 30, 2014 |
| INVENTOR(S) | : Jens Barrenscheen et al. |

Page 1 of 1

It is certified that error appears in the above-identified patent and that said Letters Patent is hereby corrected as shown below:

In the title page

Under item (73) ASSIGNEE, please delete "Infineon Technologies AG, Neubiberg (DE)" and insert -- Infineon Technologies Austria AG, Villach (AT) --, therefor.

Signed and Sealed this
Twelfth Day of April, 2016

Michelle K. Lee
*Director of the United States Patent and Trademark Office*